Patented Apr. 20, 1937

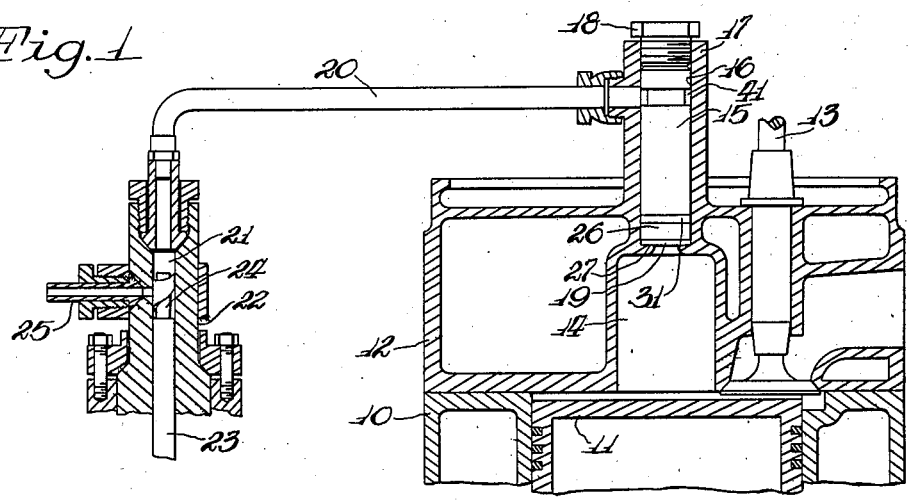

2,077,938

UNITED STATES PATENT OFFICE 2,077,938

INJECTION VALVE FOR ENGINES

Julius Kuttner, Beloit, Wis., assignor to International Harvester Company, a corporation of New Jersey Application July 5, 1935, Serial No. 29,936

4 Claims. (Cl. 299—107.5)

This invention relates to a fuel injection valve for solid injection engines. More specifically it relates to an improved valve structure for delivering intermittent fuel charges with a minimum amount of injection at low pressure.

In the construction and operation of solid injection engines, a difficulty which has always been encountered is the beginning of injection before a suitable injection pressure has been reached in the fuel supply line and the continuing of injection after the pressure has dropped too low to provide a suitable injection spray. To overcome these objections various types of injection valves have been developed.

The object of the present invention is to provide an improved injection valve combining a displacer valve for preventing a dribbling at the end of discharge with a valve means to build up a high injection pressure prior to beginning of the discharge. Other objects, such as simplified and improved construction and the provision of self-centering valves, are inherent in the structure shown in the drawing, in which:

Figure 1 is a sectional view showing the head of an engine with an injection valve mounted to deliver into a pre-combustion chamber and the essential portions of an intermittent delivery fuel pump for delivering fuel charges to the injection valve;

Figure 2 is an enlarged sectional view through the center of the injection nozzle assembly of the valve in closed position; and, Figure 3 is the same as Figure 2, showing the injection valve in its injecting position.

A portion of an engine has been shown to form a basis for describing the invention. A cylinder block 10, in which a piston 11 is shown, is provided with a cylinder head 12 of the overhead valve type, one of the valves 13 being shown. A pre-combustion chamber 14 formed in the cylinder head communicates with the main combustion space formed by the engine cylinder. An injection nozzle assembly 15 is mounted in a cylindrical bore 16 formed in an extension 17 of the cylinder head. A threaded member 18 is shown as holding the injection valve assembly in the bore 16, a sealing gasket 19 being shown in Figures 2 and 3. It is to be understood that the entire injection valve assembly is constructed to withstand the injection pressures without leakage.

A liquid conduit 20 communicates with the bore 16 and with the cylinder 21 of a pump generally referred to as 22. A piston 23 of the pump is provided with a recess 24 to provide a by-pass means at a certain point in the stroke of the pump. A fuel inlet conduit 25 communicates with the pump cylinder 21 and serves both as an inlet and as a by-pass conduit from the pump cylinder. This pump showing is somewhat diagrammatic and is primarily intended to illustrate one means by which fuel charges may be supplied to the injection valve with a sudden drop in pressure at the end of the pump stroke. It is to be understood that any suitable pump may be used, which has these characteristics.

The injection valve assembly includes a flat cylindrical injection nozzle 26 fitted into the bore 16 against the gasket 19, which seats on a projecting shoulder 27 formed around the base of the bore 16. A small orifice 28 provides communication between a larger bore 29 in the injection nozzle and the combustion chamber 14. A still larger bore 30 is formed in the injection nozzle communicating with the bore 29 and providing a space for the injection valve, as will be hereinafter described.

A sleeve member 31 is fitted within a bore 32 formed in the main valve casing 33. The sleeve 31 is spaced from the bore 32 to form an annular space between the sleeve and the bore. At its lower end the sleeve member 31 is provided with a radial flange, which is fitted into the bore 16 against the upper side of the nozzle member 26. The valve casing 33 is closely fitted into the bore 16 abutting the upper side of the flange at the base of the sleeve member 31.

A generally cylindrical valve member 34 is fitted for reciprocation in the sleeve member 31. At its upper end the valve member 34 is provided with an enlarged head portion 35 in which a small valve 36 is loosely mounted for a certain amount of lateral movement. Said valve member is, however, held against movement in a direction axially of the valve member 34 by a retaining member 37. It will be noted that the lower end of the valve 36 is provided with a conical end portion, which is fitted in a circular recess 38. By this construction the valve 36 is self-centering within the limits provided and may, therefore, assume a tight seat without the necessity of perfect machining and alignment.

The valve casing 33 is provided with a conical upper end terminating in a small fluid passage 39, which forms the fuel inlet conduit. The poppet valve 36 seats at the junction of the conical portion with the fluid passage 39 and presents a small area against which fluid pressure in the inlet conduit acts to open the valve. A conduit 40 formed in the casing 33 provides a communication between the conduit 39 and an annular recess 41 formed around the casing. The fuel conduit 20 communicates with the recess 41 for supplying fuel to the injection valve.

At its lower end the valve member 34 is provided with a head portion 42 of the same diameter as the remainder of the valve member, which acts as a displacer valve of the piston type well known in the fuel injection art. A recess 43 formed around the end of the displacer valve 42 determines the amount of movement necessary for the valve member 34 before fluid discharge may take place from the annular recess 34' formed around the valve member 34 adjacent the head portion which acts as a displacer valve. A discharge conduit 44 communicates with the recess 43 and with the annular space between the sleeve member 31 and the casing 33, thereby communicating the fluid pressure in said space to the recess 43. A spring 45 abuts the shoulder on the sleeve member 31 and the head portion 35 of the valve member 34, acting to seat the valve 36 and to retain the valve 42 in closed position, except during injection pressures in the supply conduit 20.

In the operation of an engine utilizing the injection valve assembly as described, fuel is supplied through the conduit 20 to the conduit 39. As the valve 36 presents a very small cross sectional area to the pressure of the fuel and as the spring 45 exerts a considerable pressure, the valve 36 does not open until a pressure is reached in the supply conduit sufficient for satisfactory injection. However, as soon as the valve 36 is opened, the fluid pressure operative to open the displacer valve against spring pressure is effective on an area equivalent to the cross sectional area of the valve member 34. It is, therefore, evident that the valve member 34 is rapidly moved downwardly with the displacer valve 42 into the position shown in Figure 3. Injection then takes place at a rate sufficient for proper atomization as long as injection pressure is supplied by the pump. When the by-pass of the pump operates to suddenly drop the pressure in the conduit 20, the valve member 34 is moved by the pressure of the spring 45 whereby the displacer valve 42 cuts off communication with the injection nozzle. During the remainder of the return stroke of the valve member 34, the displacer valve 42 acts to withdraw liquid from the injection nozzle, thereby preventing a dribbling discharge at the end of the injection.

It is to be understood that applicant has shown and described only a preferred embodiment of his improved fuel injection nozzle and that he claims as his invention all modifications thereof falling within the scope of the appended claims.

What is claimed is:

1. In a fuel injection system for solid injection engines employing a fuel pump constructed to deliver a fuel charge above injection pressure and to suddenly decrease the pressure upon the completion of the discharge stroke, the combination of a chamber provided with a fuel inlet conduit and a fuel discharge conduit, a spring pressed valve positioned to close the inlet conduit to the chamber and presenting a small cross-sectional area to the pressure of the fuel for opening, a second spring pressed valve positioned to open and close the discharge conduit from the chamber, the effective area of said valve on which pressure in the chamber acts to open the valve being substantially larger in cross section than the inlet valve whereby, when pressure in the inlet conduit is sufficient to open the inlet valve, said pressure is sufficient to rapidly move the second valve, thereby rapidly opening the outlet conduit.

2. In a fuel injection system for solid injection engines employing a fuel pump constructed to deliver a fuel charge above injection pressure and to suddenly decrease the pressure upon the completion of the discharge stroke, the combination of a chamber provided with a fuel inlet conduit and a fuel discharge conduit, a spring pressed poppet valve positioned to close the inlet conduit to the chamber and presenting a small cross-sectional area to the pressure of the fuel for opening, and a piston valve operable to open and close the discharge conduit, the effective area of said piston on which pressure in the chamber acts to open the valve being substantially larger in cross section than the poppet valve whereby, when pressure in the inlet conduit is sufficient to open the inlet valve, said pressure is sufficient to rapidly move the piston, thereby rapidly opening the outlet conduit.

3. In a fuel injection system for solid injection engines employing a fuel pump constructed to deliver a fuel charge above injection pressure and to suddenly decrease the pressure upon the completion of the discharge stroke, the combination of a chamber provided with a fuel inlet conduit at one end and a fuel discharge conduit, a spring pressed valve member provided with a poppet valve positioned to close the inlet conduit to the chamber and presenting a small cross-sectional area to the pressure of the fuel for opening, and a piston valve carried by the valve member at the end thereof opposite the poppet valve, said valve being operable to open and close the discharge conduit, the effective area of said piston on which pressure in the chamber acts to open the valve being substantially larger in cross section than the poppet valve whereby, when pressure in the inlet conduit is sufficient to open the inlet valve, said pressure is sufficient to rapidly move the piston, thereby rapidly opening the outlet conduit.

4. In a fuel injection system for solid injection engines employing a fuel pump constructed to deliver a fuel charge above injection pressure and to suddenly decrease the pressure upon the completion of the discharge stroke, the combination of a chamber provided with a fuel inlet conduit at one end and a fuel discharge conduit at the other end, a valve supporting member mounted for reciprocation in said chamber, a poppet valve carried by said member at one end positioned to close the inlet conduit to the chamber and presenting a small cross-sectional area to the pressure of the fuel for opening, a compression spring fitted in the chamber and abutting said valve for urging it into seated position, a piston valve carried by the valve member at the end thereof opposite the poppet valve, said piston being operable to open and close the discharge conduit, the effective area of said valve on which pressure in the chamber acts being substantially larger in cross section than the poppet valve whereby, when pressure in the inlet conduit is sufficient to open the inlet valve, said pressure is sufficient to rapidly move the piston valve, thereby rapidly opening the discharge conduit.

JULIUS KUTTNER.